(12) United States Patent
Neely

(10) Patent No.: US 11,098,574 B2
(45) Date of Patent: Aug. 24, 2021

(54) SENSOR WITH INTEGRATED WINDOW

(71) Applicant: Halliburton Energy Services, Inc., Houston, TX (US)

(72) Inventor: Jeffrey Clayton Neely, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 143 days.

(21) Appl. No.: 16/694,410

(22) Filed: Nov. 25, 2019

(65) Prior Publication Data

US 2021/0156245 A1    May 27, 2021

(51) Int. Cl.
| | |
|---|---|
| *E21B 49/00* | (2006.01) |
| *E21B 47/01* | (2012.01) |
| *G01V 5/10* | (2006.01) |
| *G01V 5/12* | (2006.01) |
| *E21B 47/017* | (2012.01) |

(52) U.S. Cl.
CPC ............ *E21B 47/017* (2020.05); *E21B 49/00* (2013.01); *G01V 5/10* (2013.01); *G01V 5/12* (2013.01)

(58) Field of Classification Search
CPC ......... E21B 47/017; E21B 49/00; G01V 5/10; G01V 5/12
See application file for complete search history.

(56) References Cited

U.S. PATENT DOCUMENTS

| | | |
|---|---|---|
| 5,250,806 A | 10/1993 | Rhein-Knudsen et al. |
| 6,666,285 B2 | 12/2003 | Jones et al. |

(Continued)

FOREIGN PATENT DOCUMENTS

| | | | |
|---|---|---|---|
| EP | 2863007 A2 | 4/2015 | |
| EP | 2586961 B1 | 2/2019 | |
| WO | WO-2008005193 A2 * | 1/2008 | ............. E21B 47/26 |

OTHER PUBLICATIONS

Tittman, J., et al., "The Physical Foundations of Formation Density Logging (Gamma-Gamma)," pp. 284-294, presented in part at the meeting of the American Physical Society, Austin, Texas, Feb. 23-24, 1962.

(Continued)

*Primary Examiner* — Mark R Gaworecki
(74) *Attorney, Agent, or Firm* — Conley Rose, P.C.; Rodney B. Carroll

(57) ABSTRACT

A detector assembly of a logging tool for disposal within a wellbore penetrating a subterranean formation and comprising: a radiation detector disposed within a pressure housing including a window section and a remaining section, the window section including a window that provides a path for radiation from outside the pressure housing to the detector, wherein the window section and the remaining section of the pressure housing form a unitary, integral structure (i) providing no space between the window section and the remaining section of the pressure housing for an influx of fluid from the wellbore between the window section and the remaining section of the pressure housing, (ii) providing a fluid impermeable structural connection between the window section and the remaining section of the pressure housing, (iii) providing a monolithic structural interface between the window section and the remaining section of the pressure housing, or (iv) combinations thereof.

20 Claims, 7 Drawing Sheets

(56) References Cited

U.S. PATENT DOCUMENTS

| | | |
|---|---|---|
| 2005/0028586 A1 | 2/2005 | Smits et al. |
| 2009/0166035 A1* | 7/2009 | Almaguer ............... E21B 43/11 |
| | | 166/254.1 |
| 2012/0170023 A1 | 7/2012 | Szobota et al. |
| 2014/0251690 A1 | 9/2014 | Simon et al. |
| 2014/0374582 A1 | 12/2014 | Guo et al. |
| 2016/0032708 A1* | 2/2016 | Mahjoub ............... E21B 47/017 |
| | | 166/66 |

OTHER PUBLICATIONS

Foreign Communication from Related Application—International Search Report and Written Opinion of the International Searching Authority, International Application No. PCT/US2019/063158, dated Aug. 20, 2020, 13 pages.

* cited by examiner

US 11,098,574 B2

SENSOR WITH INTEGRATED WINDOW

TECHNICAL FIELD

The present disclosure relates generally to systems and methods for downhole logging.

BACKGROUND

For gamma ray density drilling tools, a gamma detector sits near the outside diameter of a drill collar. Generally, a special metal section known as a "blade" sits over the detector and makes contact with the formation. It is desirable to limit the amount of drilling fluid (e.g., mud) that comes between the detector and the formation. Such drilling fluid that comes between the detector and the formation is known as "mud under the blade". This "mud under the blade" inhibits the gamma ray detection. Generally, a special elastomer 'pad' is squeezed between an outside surface of a pressure housing of the detector and an inside surface of the blade to keep mud out of the "window" or path for gamma rays. This elastomer pad does not entirely prevent mud from getting between the blade and the detector, which leads to a deterioration of the radiation signal.

BRIEF SUMMARY OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
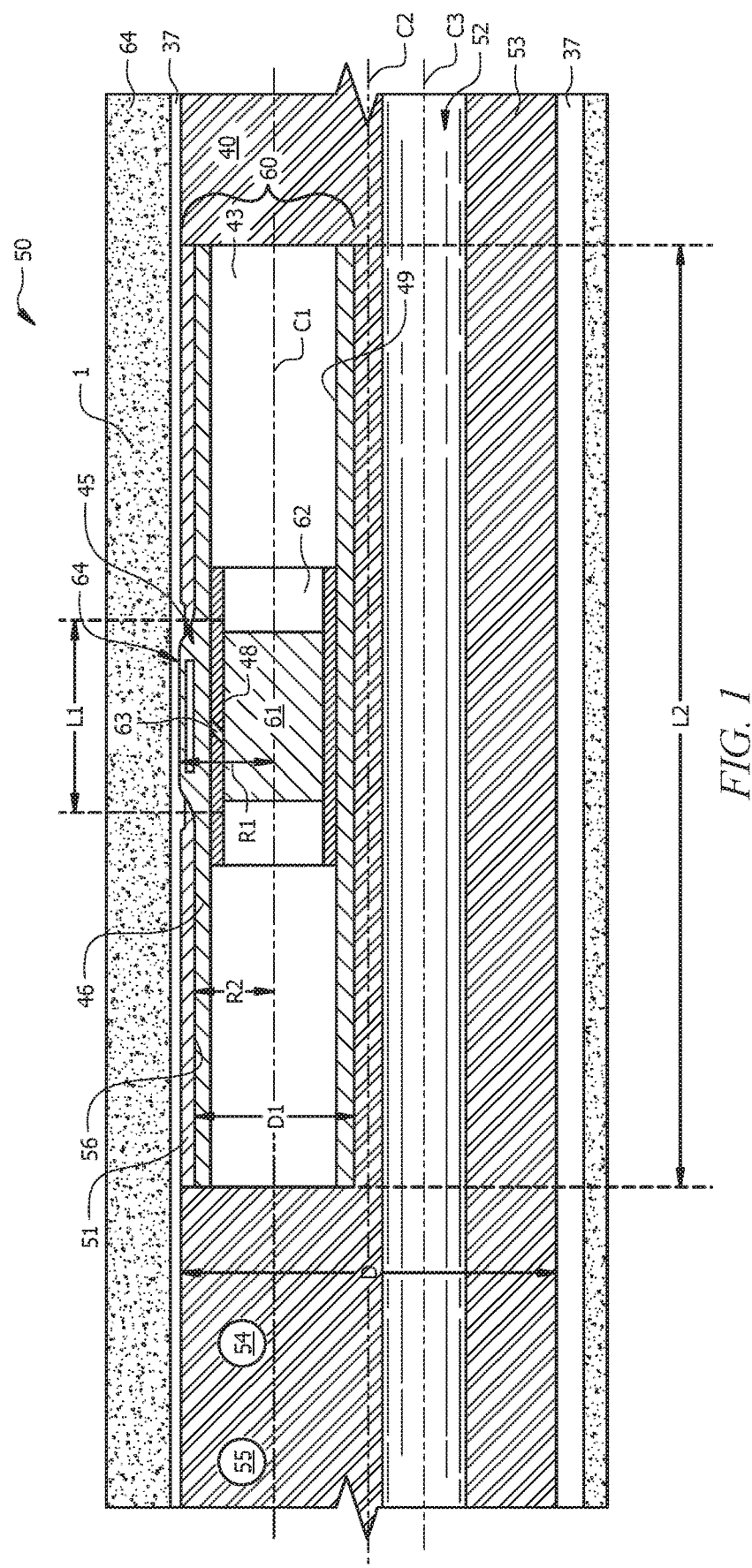
FIG. 1 is a schematic cutaway view of a logging tool in a geologic formation, the logging tool comprising a detector assembly of this disclosure.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The term "formation" as utilized herein includes a subsurface formation, a subterranean formation, and a subsea formation. The term "surface" can refer to a surface of the earth or a surface of the sea, from which a logging tool of this disclosure is introduced into the wellbore.

As utilized herein, a "window" comprises a path for gamma radiation from a formation to a detector of a detector assembly of a logging tool.

A descriptor numeral can be utilized generically herein to refer to any embodiment of that component. For example, as described herein, a section or subassembly 31 of BHA 30 can refer to any section or subassembly 31A-31E depicted in FIG. 6A, or any other section or subassembly of a BHA known to those of skill in the art.

This disclosure addresses the "mud under the blade" issue mentioned hereinabove. For gamma ray density drilling tools, for example, a gamma detector is typically positioned near the outside diameter of a drill collar, and it is desirable to limit the drilling fluid or "mud" that gets between the detector and the formation, as such mud can inhibit the detection of gamma rays (also referred to herein as "gamma radiation"). For conventional detector assemblies comprising a special metal section known as a "blade" that is positioned over the detector and makes contact with the formation, an elastomer is squeezed between the pressure housing of the detector and the inside of the blade in an effort to keep mud out of the "window" or path for gamma rays. However, drilling fluid is not entirely prevented from getting between the metal blade and the detector, which leads to a deterioration of the signal.

Disclosed herein are a detector assembly for use in a logging tool, and a method of utilizing same. The detector assembly comprises an integrated window and pressure housing to eliminate the aforementioned "mud under the blade" issue. The apparatus and method of this disclosure can thus be utilized to eliminate the "mud under the blade" issue and thereby enable improved measurement consistency for drilling tools (e.g., density measurements tools, such as gamma ray tools).

Via this disclosure, a window section comprising a window for radiation is integrated into the same part as the pressure housing for the detector. The window section and the remaining section of the pressure housing can both be machined from a single part or can be machined as two parts and subsequently integrated (e.g., welded together).

Herein disclosed are apparatus, systems, and methods for sensing a property of a formation via a logging tool for disposal within a wellbore penetrating a subterranean formation. FIG. 1 is a schematic cutaway view of a logging tool 50 in a geologic formation 1, the logging tool 50 comprising a detector assembly 60 of this disclosure. According to this disclosure, a detector assembly 60 comprises a detector 61 (e.g., a radiation detector) disposed within a pressure housing 40 (also referred to herein as a "detector housing"). Although at times described herein with reference to a gamma radiation detector, the radiation detected by radiation detector 61 can be from gamma rays or x-rays (generally, radiation due to high energy photons) or from neutrons.

Figure 2:
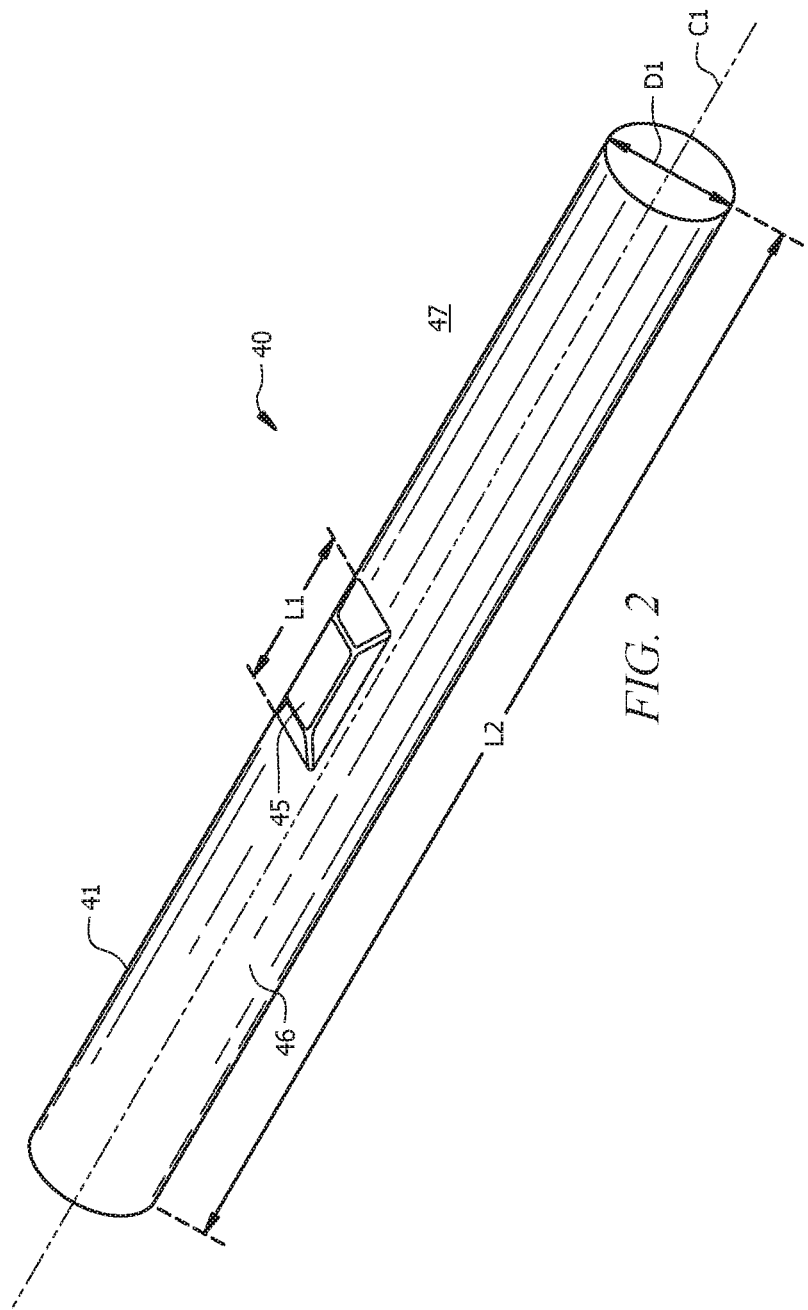
FIG. 2 is a schematic isometric view of a pressure housing in accordance with embodiments of this disclosure.

As depicted in FIG. 2, which is a schematic isometric view of a pressure housing 40, a pressure housing 40 according to this disclosure comprises a window section 45 and a remaining section 46 of pressure housing 40. The window section 45 comprises a window 64 (FIG. 1) that provides a path for radiation (e.g., gamma radiation) from outside the pressure housing 40 to the radiation detector (61, FIG. 1). In the embodiment of FIG. 2, pressure housing 40 is primarily cylindrical in shape. That is, remaining section 46 comprises an outside diameter D1 along a portion of axial length L2 thereof along central axis C1 of pressure housing 40 outside the axial length L1 along which window section 45 extends along central axis C1. Pressure housing 40 and/or remaining section 46 of the pressure housing 40 can be substantially cylindrical along an axial length L2 thereof, with window section 45 providing an only non-cylindrical region. Central axis C1 of pressure housing 40 is also the central axis of remaining section 46 of pressure housing 40 and of an interior detector cavity 43 (FIG. 1) within and defined by pressure housing 40. At some location along axial length L2, a large 'hump' or extension protrudes from the cylinder of remaining section 46, providing window section 45. Window section 45 can have a shape other than the hump depicted in FIGS. 1-4, and other shapes of window section 45 are included in this disclosure.

The window section 45 and the remaining section 46 of the pressure housing 40 form a unitary, integral structure: (i) providing no space between the window section 45 and the remaining section 46 of the pressure housing 45 for an influx of fluid from a wellbore (e.g., wellbore 12, as depicted in and described further hereinbelow with reference to FIG. 6A and FIG. 6B) between the window section 45 and the remaining section 46 of the pressure housing 40, (ii) providing a fluid impermeable structural connection between the window section 45 and the remaining section 46 of the pressure housing 40, (iii) providing a monolithic structural interface between the window section 45 and the remaining section 46 of the pressure housing 40, or (iv) combinations thereof. The remaining section 46 of the pressure housing 40 and the window section 46 of the pressure housing 40 can be machined as a single component. Alternatively, the remaining section 46 of the pressure housing 40 and the window section 45 of the pressure housing 40 can be machined as separate components and subsequently integrated to provide the unitary, integral structure. When machined as separate components and subsequently integrated to provide the unitary, integral structure, the remaining section 46 of the pressure housing 40 and the window section 45 of the pressure housing 40 can be integrated by any suitable methods known to those of skill in the art. For example, in applications, the remaining section 46 of the pressure housing 40 and the window section 45 of the pressure housing 40 can be integrated by welding, or any other (e.g., permanent) joining method. Detector or pressure housing 40 can be designed to protect detector 61 from pressures of greater than or equal to about 10,000 psi (68.9 MPa), 15,000 psi (193.4 MPa), 20,000 psi (137.9 MPa), 25,000 psi (172 MPa); 30,000 psi (206 MPa); or 35,000 psi (241 MPa). In embodiments, the pressure housing 40 is a detector housing that is not designed for exposure to pressures substantially greater than atmospheric pressure. That is, although described as a pressure housing 40, in embodiments, pressure housing 40 can be a detector housing that can be utilized to eliminate the "mud under the blade" issue of conventional detector assemblies (i.e., prevent ingress of drilling fluid between detector 61 and window 64) in a detector assembly designed for lower pressure applications. In embodiments, a disparate detector housing is encapsulated by pressure housing 40.

The unitary, integral structure provided by pressure housing 40 eliminates mud ingress between the window section 45 and the detector 61 and thus reduces an amount of drilling fluid between formation 1 and detector 61 relative to conventional detector assemblies comprising a blade above window 64. Accordingly, errors with calibration of the logging tool 50 encountered during logging with a conventional detector assembly can be mitigated. As drilling fluid or "mud" creeps between the formation 1 and the detector 61, the signal can deteriorate during a single drilling run. Because it is difficult to determine how much drilling fluid (e.g., mud), if any, is squeezing between the two parts of conventional detectors (i.e., between the pressure housing and blade of conventional detector assemblies), it is generally not possible to recalibrate such conventional apparatus in situ, and the measurement and data interpretation can vary considerably from reality over the course of a drilling run, which can lead to lost productivity. The solution provided by the unitary, integral structure of the herein disclosed pressure housing 40 (i.e., the integrated window section 45 and remaining section 46) can provide for increased accuracy of the measurement(s) obtained with a logging tool 50 comprising the detector assembly 50, and can also improve reserve estimations obtained from the measurement(s). Because the only drilling fluid that can be between detector 61 of the detector assembly 60 of this disclosure and formation 1 is within annulus 37 between formation 1 and pressure housing 40, and because the amount of drilling fluid in annulus 37 can be estimated (e.g., via an acoustic pinger 55 or other means known to those of skill in the art), a logging tool 50 of this disclosure comprising detector assembly 60 can be calibrated in situ, and thus provide for increased confidence in and reliability and accuracy of measurements obtained therewith.

The remaining section 46 of the pressure housing 40 can comprise a first material and the window section 45 of pressure housing 40 can comprise a second material. The first material and the second material can be the same or different. The first material, the second material, or both the first material and the second material can comprise a material having a yield strength sufficient for use in a wellbore 12 (FIG. 6A and FIG. 6B) and comprising one or more elements. The yield strength required for a given well can be dependent upon the pressure of the fluid and the geometry of the pressure housing as well as intrinsic mechanical properties; however, by way of non-limiting example, in applications, a combination of the material properties of the first material, the second material, or both the first material and the second, the geometry of pressure housing 40, and a pressure loading for a given setup is such that plastic deformation and/or stress cracking are reduced and/or eliminated so as to prevent fluid leakage or damage to any constituent components. In embodiments, a concentration of the one or more elements of the material each or in combination comprise less than a concentration of the each or the combination of the one or more elements in the subterranean formation 1.

Figure 3A:
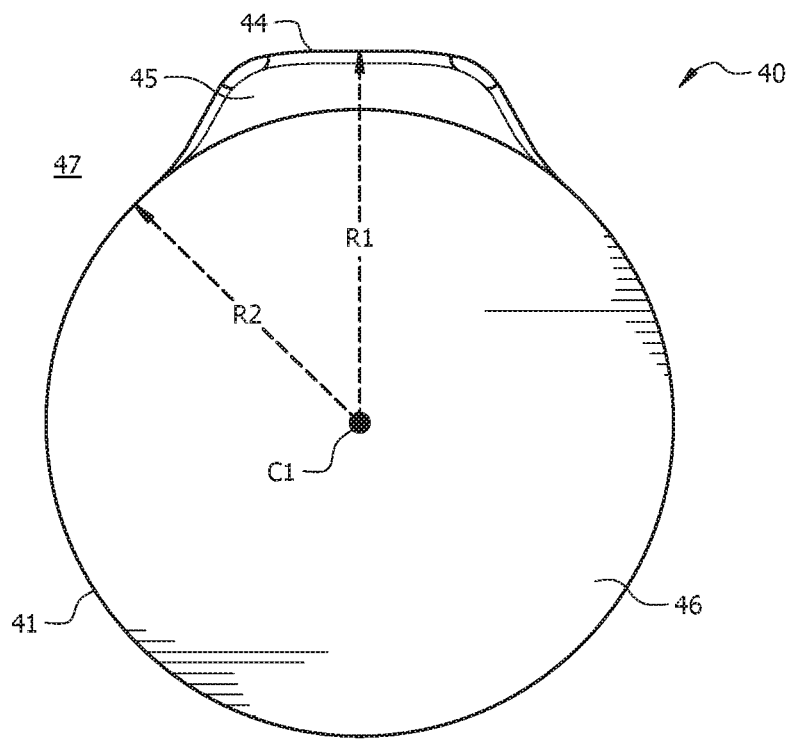
FIG. 3A is a schematic end view of a pressure housing, according to embodiments of this disclosure.
Figure 3B:
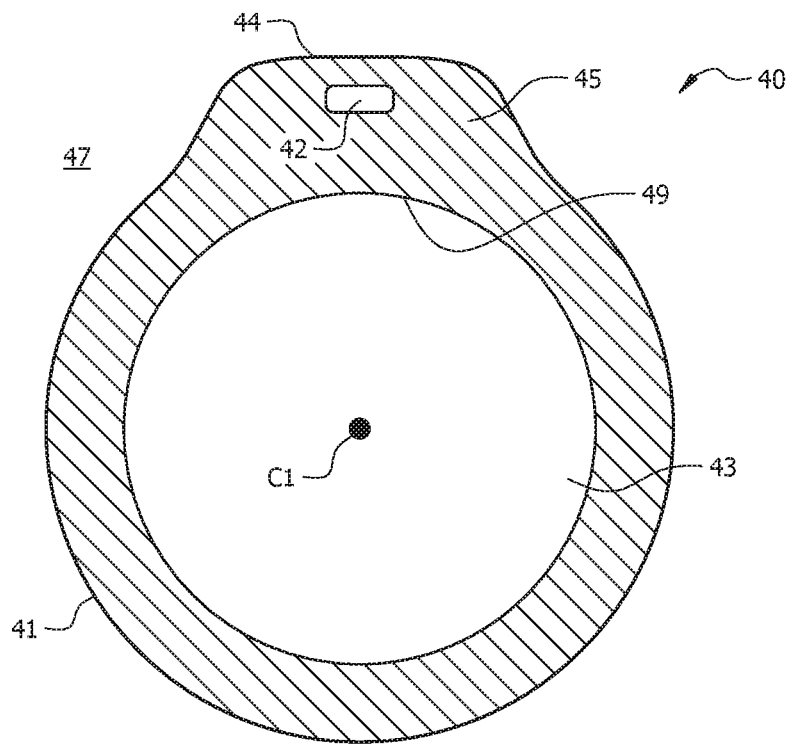
FIG. 3B is a schematic right plane cutaway view of the pressure housing of FIG. 3A.

FIG. 3A is a schematic end view of a pressure housing 40, according to embodiments of this disclosure; and FIG. 3B is a schematic right plane cutaway view of the pressure housing 40 of FIG. 3A. FIG. 3A and FIG. 3B show central axis C1 of pressure housing 40 (and of remaining section 46). Pressure housing 40 has an external surface 41 and an interior surface 49. Window section 45 has an outside surface 44. An outside of pressure housing 40 is indicated at 47. As depicted in FIG. 3B, the window section 45 can further comprise a void, cavity, or pocket 42 absent the second material, wherein the pocket absent the second material is fluidly sealed from an outside 47 of the pressure housing 40. The pocket 42 can limit signal attenuation. A window section 45 can comprise one or a plurality of pockets 42. The optional pocket(s) 42 within window section 45 may be created by, for example, machining processes and resealed, for example, with a weld, a threaded plug, or another type of mechanical seal. The pocket(s) 42 can be created, for example, by electromachining processes, such as, without limitation, electrical discharge machining (EDM), which EDM processes are known to those of skill in the art. Pocket(s) 42 can have any desired shape, such as, without limitation, rectangular or cylindrical.

Figure 4:
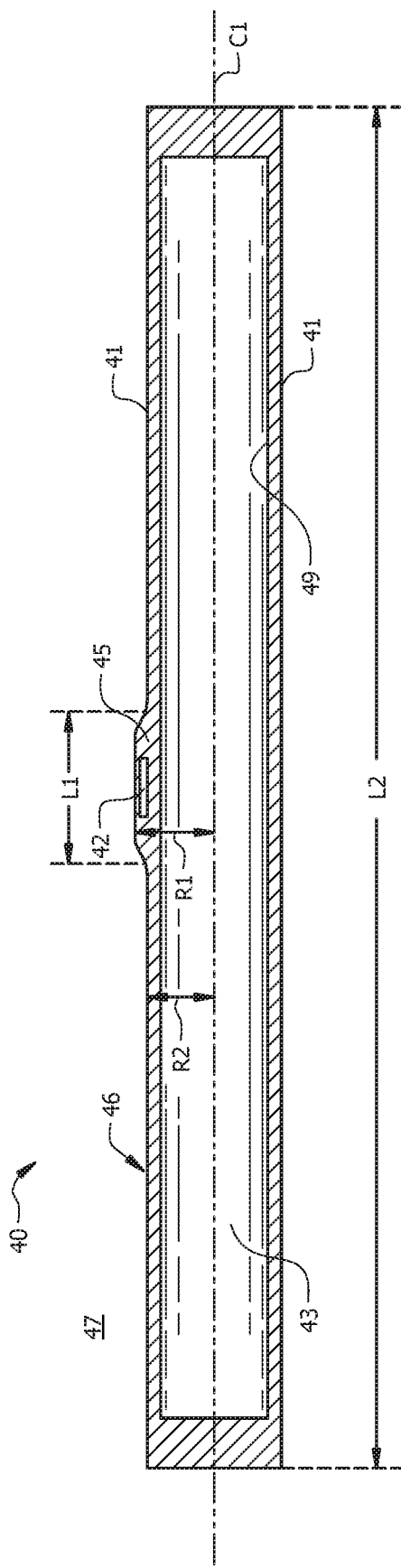
FIG. 4 is a schematic front plane cutaway view of a pressure housing, according to embodiments of this disclosure.

FIG. 4 is a schematic front plane cutaway view of a pressure housing 40, according to embodiments of this disclosure. As seen in FIG. 3A and FIG. 4, the window section 45 extends a farther radial distance R1 from a central axis C1 of the remaining section 46 of the pressure housing 40 along axial length L1 (FIG. 1) of the window section 45 than a radial distance R2 the remaining section 46 of the pressure housing 40 extends radially from the central axis C1 of the remaining section 46 of the pressure housing 40 along an axial length L2 pressure housing 40 outside window section 45.

Figure 5:
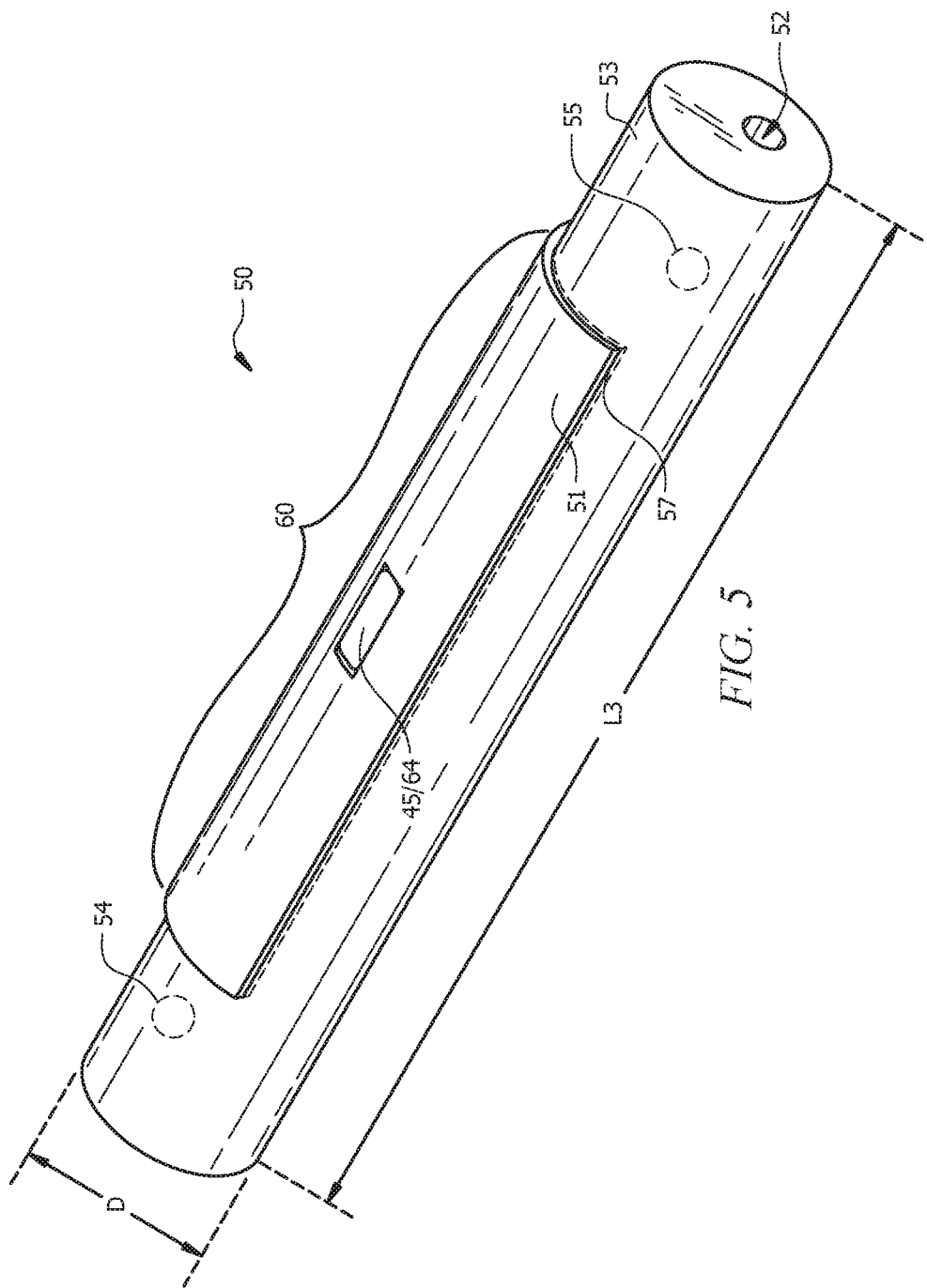
FIG. 5 is an isometric view of a detector assembly section of a logging tool 50, according to embodiments of this disclosure.

FIG. 5 is an isometric view of a detector assembly 60 section of a logging tool 50, according to embodiments of this disclosure. As seen in FIG. 5, a detector assembly 60 of this disclosure can further comprise a cover or "blade" 51 coupled with the exterior surface 41 of the remaining section 46 of the pressure housing 40 along the axial length L2 thereof, such that the cover 51 does not extend over the window 64 of window section 45. Cover 51 can extend about a same radial distance from the central axis C1 of the remaining section 46 as the radial distance R1 the window section 45 extends from the central axis C1 of the remaining section 46 of pressure housing 40, such that the logging tool 50 has a substantially uniform diameter D along an entire axial length L3 of logging tool 50. Cover or blade 51 can thus serve to protect or cushion window section 45 and remaining section 46 of pressure housing 40 from contact with formation 1. In FIG. 5, tubular 53 (e.g., a drill collar, described further hereinbelow with reference to FIG. 1), the blade/cover 51, and the window section 45 are depicted; for simplicity, other details such as screws and stress-alleviating contours (e.g., to alleviate stress concentration at edges and corners) are not included.

As noted hereinabove, detector assembly 60 comprises a detector 61 (e.g., a radiation detector) disposed within pressure or detector housing 40. As depicted in FIG. 1, FIG. 3B, and FIG. 4, the detector 61 of detector assembly 60 can be disposed within an interior cavity 43 of pressure housing 40. Detector 61 can comprise a radiation detector. In embodiments, detector 61 comprises a gamma radiation detector. The radiation detector can comprise a scintillation detector. Such a scintillation detector can comprise, for example, a scintillation crystal optically coupled to a photomultiplier tube (PMT), as known to those of skill in the art. In embodiments, the detector 61 comprises a neutron detector. Such a neutron detector can comprise one or more helium-3 tubes. Although described hereinbelow as a radiation detector for density and/or porosity measurement, a pressure/detector housing 40 comprising an integrated, unitary window section 45, as described herein, can be utilized for an alternative sensor (e.g., a sensor or logging tool other than a gamma radiation detector). Interior cavity 43 can be cylindrical, or another shape.

Detector assembly 60 can further comprising a shield 62 disposed within the pressure housing 40. Shield 62 can be disposed within interior cavity 43 of pressure housing 40 around detector 61, and can provide radiation path 63 (e.g., a gamma ray path) for radiation to pass through window 64 of window section 45 and impinge radiation detector 61. As will be understood to those of skill in the art, shield 62 can reduce an amount of radiation produced within the logging tool 50 that reaches the radiation detector 61, and enable radiation (e.g., gamma rays) to enter the logging tool 50 through one or more specified vectors, thus enabling azimuthal measurement. Shield 62 can be a gamma radiation shield. Gamma radiation shield 62 can have a high scatter cross section and/or a high absorption cross-section. As known to those of skill in the art, the scatter cross section and absorption cross section correlate with density and atomic number, respectively. For example, and without limitation, such a gamma radiation shield 62 can comprise tungsten, lead, or a combination thereof.

With reference back to FIG. 1, the hump or window section 45 of pressure housing 40 comprising cavity or pocket 42, and the removed material in the shield 63 (also referred to as the "collimator") that provides the flow path 63 for radiation through shield 63 to detector 61, make up the window 64 between the formation 1 and the (e.g., gamma ray) detector 61. This window 64 allows the (e.g., gamma) rays to exit the formation 1 and enter the logging tool 50 through specified vectors. In applications in which blade/cover 51 does not form a pressure seal with tubular (e.g., collar) 53 (FIG. 1 and FIG. 5) nor with the pressure housing 40, fluid in the annulus 37 between the formation 1 and logging tool 50 may enter between the blade/cover 51 and pressure housing 40. As is apparent in FIG. 1, no fluid is able to penetrate between the outside surface 44 of the window section 45 (e.g., the hump of pressure housing 40) and the outside surface 48 of the crystal/detector 61. That is, fluid in wellbore 12 is not able to enter window section 45. Drilling fluid (e.g., mud) between the exterior surface 41 of the pressure housing 40 and the inside surface 56 of the blade/cover 51 but axially outside of window section 45 (i.e., along axial length L2 outside of axial length L1 of window section 45) is of no concern, as such drilling fluid will not affect measurements taken by logging tool 50. When using a logging tool 50 of this disclosure, the only mud that may be in the path of the signal (e.g., gamma radiation) to be detected by detector 61 may be between the outside surface 44 of the window section 45 (e.g., the "hump" of FIG. 1A) and the inside surface or side walls 7 of the formation 1. Due to the integrated design of pressure housing 40, drilling fluid is prevented from entering window section 45 and thus is prevented from encroaching into window 64 thereof.

Also disclosed herein is a logging tool 50 comprising a detector assembly 60 of this disclosure. Logging tool 50 can comprise detector assembly 60 disposed therein, for example, disposed in a tubular 53. For example, with reference now to FIG. 5, tubular 53 can comprise a cavity or recess 57 into which detector assembly 60 can be disposed. The tubular 53 can be a drill collar that defines a fluid flow path 52 (also referred to herein as a flow bore 52) along an axial length L3 of logging tool 50 or drill collar 53. The drill collar 53 can comprise steel, nickel, an alloy thereof, or a combination thereof. Tubular 53 is adapted to provide for flow of drilling fluid therethrough via fluid flow path 52.

As depicted in FIG. 1 and FIG. 5, a central axis C3 of the fluid flow path 52 can be offset from a central axis C2 of the tubular or drill collar 53. The logging tool 50 can further comprise a radiation source 54 disposed within the logging tool 50 and axially spaced (e.g., along length L3 of logging tool 50) from the detector assembly 60. The radiation source 54 can comprise, for example, a radioactive chemical gamma radiation source, an x-ray generator, a chemical neutron source, and/or a neutron generator (e.g., a pulsed neutron source).

The logging tool 50 can further comprise an acoustic pinger 55 operable to measure a distance between a wall 7 of the wellbore 12 and the radiation detector 61, such that measurements obtained by the radiation detector 61 can be calibrated for an amount of drilling fluid present between detector 61 and formation 1. The acoustic pinger 55 can be coupled with the logging tool 50 and operable to measure a distance between the logging tool 50 and wellbore walls 7 and can be utilized for in situ calibration of the measurement obtained by logging tool 50.

Figure 6A:
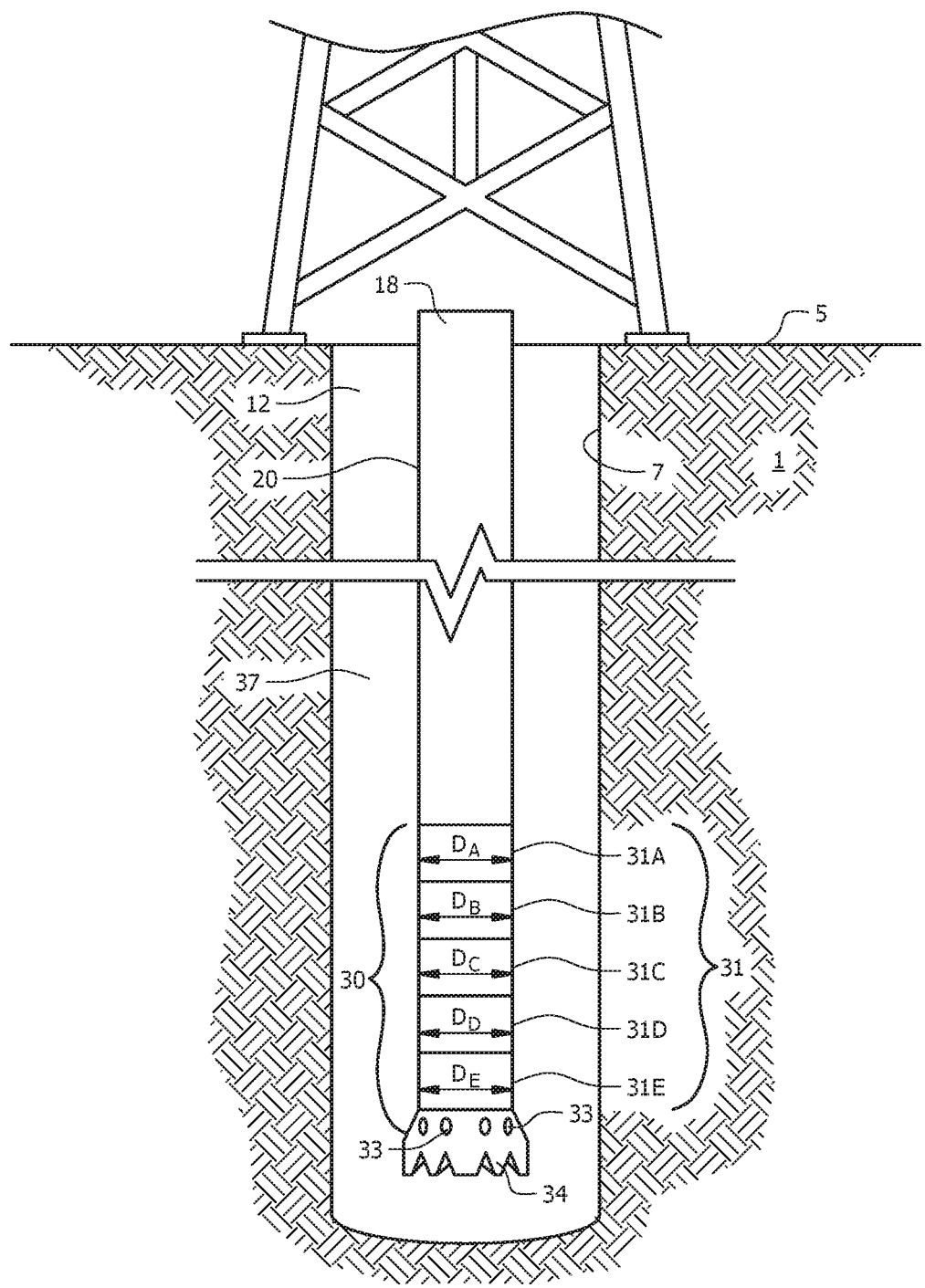
FIG. 6A is a schematic view of a subsurface formation penetrated by a wellbore in which a logging tool of this disclosure (e.g., a drilling tool) can be positioned via a drill string.
Figure 6B:
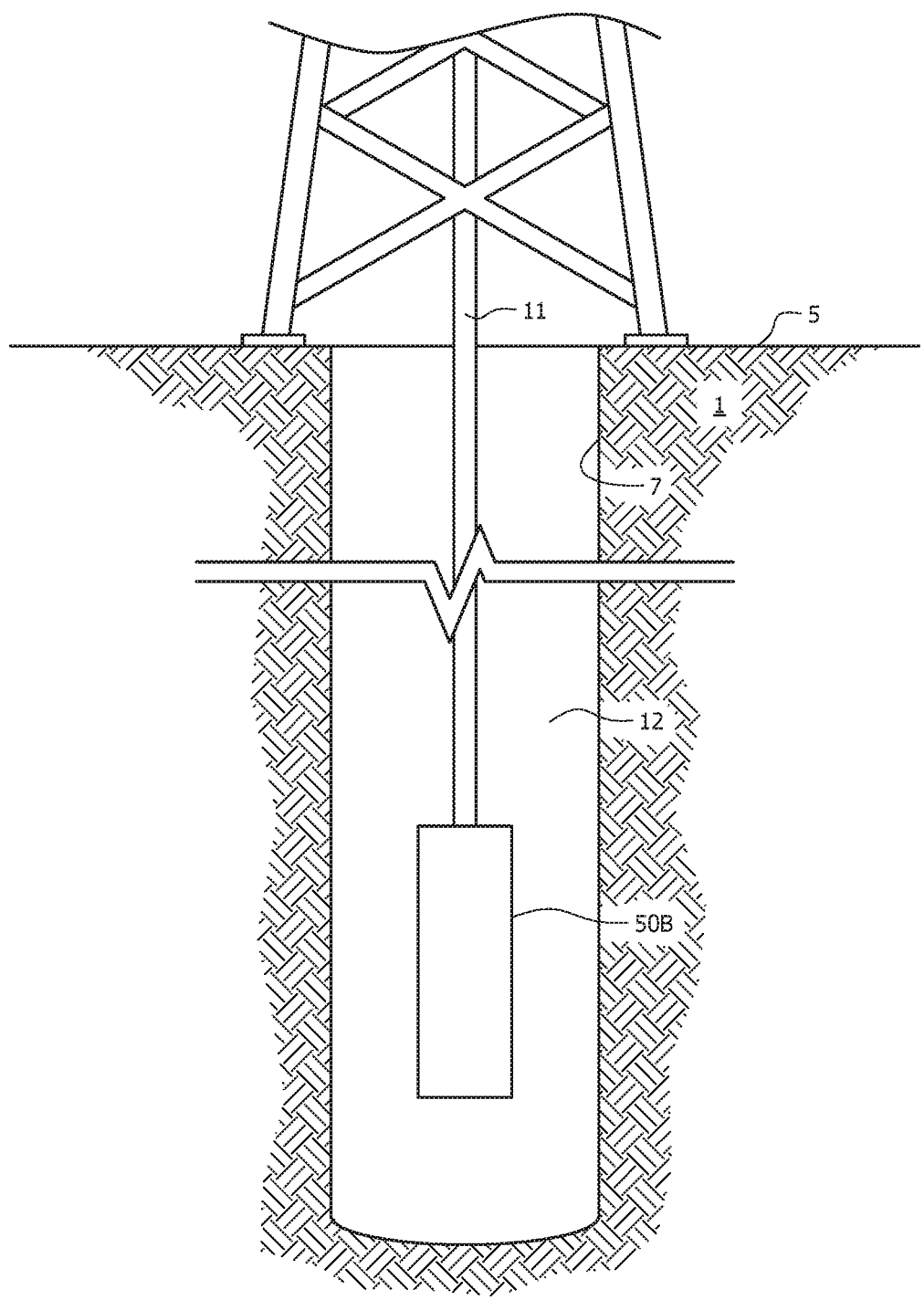
FIG. 6B is a schematic view of a subsurface formation penetrated by a wellbore in which a wireline tool of this disclosure (e.g., a wireline tool) can be positioned via a wireline cable.

The logging tool 50 comprising the detector assembly 50 of this disclosure can be a logging while drilling tool 50A (e.g., a LWD or MWD) conveyable into the wellbore 12 by a drill string 18 or a wireline tool 50B conveyable into the wellbore 12 via a logging cable 11 (e.g., a wireline cable), as depicted in FIG. 6A and FIG. 6B, respectively. FIG. 6A is a schematic view of a subsurface formation 1 penetrated by a wellbore 12 in which a logging tool 50 of this disclosure (e.g., a drilling tool 50A) can be positioned via a drill string 18. Drill string 18 comprises a conveyance 20 and a bottom hole assembly (BHA) 30. BHA 30 comprises a drill it 34 having ports 33, and further comprises one or more sections or subassemblies 31, with five sections or subassemblies 31A, 31B, 31C, 31D, and 31E depicted in FIG. 6A. One or more of the sections or subassemblies 31 can comprise a drilling tool 50A comprising a detector assembly of this disclosure. BHA 30 can comprise one or more MWD sections, subassemblies or downhole tools operable to provide an MWD measurement selected from direction, inclination, survey data, downhole pressure (inside and/or outside drill pipe), resistivity, density, and/or porosity. For example, BHA 30 can comprise a section or subassembly 31 that can be an MWD subassembly configured for measuring direction and/or orientation; a section or subassembly 31 that can be an MWD subassembly configured for measuring pressure; a section or subassembly 31 that can be an MWD subassembly configured for measuring resistivity; and/or a section or subassembly 31 that can be an MWD subassembly configured for measuring density and/or porosity, for example, via gamma ray technology. BHA 30 can further comprise one or more sections or subassemblies comprising processors or apparatus for providing telemetry of data from one or more of the other sections or subassemblies to surface 5. For example, a telemetry section or subassembly 31 can comprise a mud pulser. In embodiments, BHA 30 comprises one or more LWD sections, subassemblies or downhole tools, such as an LWD section 31 comprising a formation tester configured for taking one or more formation samples, for example, for further analysis after transport uphole. According to this disclosure, one or more sections or subassemblies 31 of BHA 30 can comprise a downhole tool 50A comprising a detector assembly 60 as detailed herein. The arrangement and components of subassemblies 31 described with reference to FIG. 6A is intended to be exemplary, rather than exhaustive, and other components/sections/subassemblies of a BHA and arrangements thereof can be included in a BHA 30, provided the BHA comprises a drilling tool 50A comprising a detector assembly 60, as described herein.

FIG. 6B is a schematic view of a subsurface formation 1 penetrated by a wellbore 12 in which a wireline tool 50 of this disclosure (e.g., a wireline tool 50B) can be positioned via a wireline cable 11. Wireline tool 50B comprises a detector assembly 60, as described herein.

As best depicted in FIG. 6A, the logging tool 50 can comprise one or more additional drill collars. For example, in FIG. 6A, section 31A may comprise a drilling tool 50A of this disclosure, having an outer diameter $D_A$. One or more sections or subassemblies 31B, 31C, 31D, and/or 31E can comprise a drill collar having an outer diameter $D_B$, $D_C$, $D_D$, $D_E$, respectively. The outer diameter $D_A$ of the logging tool 50A of this disclosure along an axial length L3 thereof including the window section 45 can be within at least 5, 10, or 15% of an outer diameter of each of the one or more additional drill collars.

With reference back to FIG. 5, detector assembly 60 can be configured to be disposed in the tubular 53 of logging tool 50 in a radial, as opposed to an axial, direction. That is tubular 53 can comprise cylindrical cavity or recess 57 into which detector assembly 60 can be radially inserted during makeup of drilling tool 50.

The pressure housing 40 can comprise additional windows 64 and window sections 45 at varying positions and/or orientations. Additionally, a detector assembly 60 of this disclosure can comprise a sensor or detector other than a gamma detector for density measurements.

Also disclosed herein is a method of measuring a property of material in a subterranean formation 1 penetrated by a wellbore 12. The method comprises disposing, in the wellbore 12, a logging tool 50 as described herein, and measuring at least one property of the subterranean formation 1 with the logging tool 50. As described hereinabove, the detector assembly 60 comprises a radiation detector 61 disposed within a pressure housing 40. The pressure housing 40 comprise window section 45 and remaining section 46. The window section 45 of pressure housing 40 comprises a window 64 that provides a path for radiation from outside the pressure housing 47 to the detector 61. The window section 45 and the remaining section 46 of the pressure housing 40 form a unitary, integral structure, as detailed hereinabove.

As depicted in FIG. 6A, disposing the detector assembly 60 in the wellbore 12 can comprise conveying a drilling tool 50A comprising the detector assembly 60 into the wellbore 12 by a drill string 18 or, as depicted in FIG. 6B, conveying a wireline tool 50B comprising the detector assembly 60 into the wellbore 12 via a logging cable 11 (e.g., a wireline cable).

In embodiments, the detector 61 comprises a gamma radiation detector, and the property comprises a bulk density and/or a porosity of the formation 1. As will be apparent to those of skill in the art upon reading this disclosure, other detector 61 and property measurement combinations are possible, and are included in the scope of this disclosure.

Also disclosed herein is a method of assembling a logging tool 50 of this disclosure, the method comprising: providing a tubular 53 having a recess or cavity 57 therein, and radially inserting a detector assembly 60 of this disclosure into the recess or cavity 57 of the tubular. The method can further comprise forming the detector assembly 60. Forming the detector assembly 60 can comprise forming a pressure housing 40 comprising window section 45 and remaining section 46 such that window section 45 and remaining section 46 of pressure housing 40 form a unitary, integral structure surrounding a shield 62 and a detector 61. Shield 62 can be positioned such that shield 62 completely surrounds detector 61 except along a radiation path 63 that extends from pressure housing 40 (e.g., extends from an interior surface 49 of pressure housing 40 within window section 45 to outside surface 48 of detector 61). Forming pressure housing 40 comprising window section 45 and remaining section 46 can comprise forming pressure housing 40 comprising window section 45 and remaining section 46 such that window section 45 and remaining section 46 of pressure housing 40 form a unitary, integral structure: (i)

providing no space between the window section and the remaining section of the pressure housing for an influx of fluid from the wellbore between the window section 45 and the remaining section 46 of the pressure housing 40, (ii) providing a fluid impermeable structural connection between the window section 45 and the remaining section 46 of the pressure housing 40, (iii) providing a monolithic structural interface between the window section 45 and the remaining section 46 of the pressure housing 40, or (iv) combinations thereof. In embodiments, forming pressure housing 40 further comprises providing one or more pockets 42 in window section 45. Pocket(s) 42 can be formed by any methods known to those of skill in the art. For example, as noted hereinabove, pocket(s) 42 can be formed by machining. The method of assembling logging tool 50 can further comprise resealing any openings into window section 45 formed during the forming of pocket(s) 42, to provide a pressure and fluid tight seal around pocket(s) 42. For example, subsequent machining processes utilized to form pocket(s) 42, any openings extending from outside surface 44 of window section 45 can be resealed, for example, with a weld or some other mechanical seal.

A method of forming logging tool 50 can further comprise positioning a radiation source 54, an acoustic pinger 55, and/or optionally other components within tubular 53, as described hereinabove and known to those of skill in the art with the help of this disclosure.

With reference to FIG. 6A and as noted hereinabove, logging tool 50 can be a drilling tool 50A. In such applications, tubular 53 can further comprise a fluid flow path or flow bore 52 adapted for the flow of drilling fluid therethrough, and can be positioned within or comprise a section or subassembly 31 of a BHA 30. In such applications, providing tubular 53 having recess or cavity 57 therein can further comprise providing tubular 53 having a fluid flow path 52 therethrough. The fluid flow path 52 can be offset from a central axis C3 of the drilling tool 50A, as described hereinabove. The BHA 30 can be coupled with a conveyance 20 of a drill string 18.

With reference to FIG. 6B, in alternative embodiments, logging tool 50 can be a wireline tool 50B, and can be designed for coupling with a wireline 11 for introduction into wellbore 12. In such embodiments, a fluid flow path 52 may not be present within tubular 53 of logging tool 50B.

Those of ordinary skill in the art will readily appreciate various benefits that may be realized by the present disclosure. The system and method of this disclosure allow for eliminating the mud under the blade issue encountered by conventional detector assemblies. By eliminating mud ingress between the window section 45 and the detector 61 and thus reducing an amount of drilling fluid in front of the detector 61 (e.g., between detector 61 and formation 1 of cover 51), errors with calibration of the logging tool 50 can be mitigated. When drilling fluid or mud enters between the formation 1 and the detector 61, the signal can deteriorate during a single drilling run. As noted hereinabove, because it is difficult if not impossible to determine with any certainty how much, if any, drilling fluid is squeezing between the two parts (e.g., the pressure housing and blade) of a conventional detector assembly and thus cannot correspondingly recalibrate the logging tool in situ, the measurement and data interpretation can vary considerably from true readings over the course of a drilling run performed with a conventional logging tool comprising a detector assembly having multiple components between which drilling fluid can impinge. The integrated solution (e.g., the pressure housing 40 having a unitary, integral structure) described in this disclosure may reduce reliability costs and maintenance costs by eliminating a failure mechanism and its associated repair costs, while increasing the accuracy of the measurement and thus also improving reserve estimates based on the measurements obtained with the herein disclosed logging tool and method.

Mud, vibration, and even assembly and disassembly of conventional detector assemblies can harm and destroy the elastomer pad and thus allow the undesirable introduction of fluids between the detector housing and the blade, which can lead to the need for considerable maintenance to control. Contrary to conventional detector assemblies (e.g., for gamma ray detection), the detector assembly 60 of this disclosure eliminates the ingress of drilling fluid between the exterior surface 41 of the pressure housing 40 and the inside surface 56 of the blade/cover 51 in the path of window 64 (e.g., along length L1 of window section 45) by eliminating the blade within window section 45 and integrating window section 45 with remaining section 46 of pressure housing 40 such that the window section 45 and the remaining section 46 of the pressure housing form a unitary, integral structure as described herein. The herein disclosed system and method for downhole logging that eliminate the mud under the blade issue thus enable improved measurement consistency for logging tools, such as, without limitation, gamma tools for density measurement.

ADDITIONAL DISCLOSURE

The following are non-limiting, specific embodiments in accordance with the present disclosure:

Embodiment A: A detector assembly of a logging tool for disposal within a wellbore penetrating a subterranean formation, the detector assembly comprising: a radiation detector disposed within a pressure housing, the pressure housing including a window section and a remaining section, the window section including a window that provides a path for radiation from outside the pressure housing to the detector, wherein the window section and the remaining section of the pressure housing form a unitary, integral structure (i) providing no space between the window section and the remaining section of the pressure housing for an influx of fluid from the wellbore between the window section and the remaining section of the pressure housing, (ii) providing a fluid impermeable structural connection between the window section and the remaining section of the pressure housing, (iii) providing a monolithic structural interface between the window section and the remaining section of the pressure housing, or (iv) combinations thereof.

Embodiment B: The detector assembly of Embodiment A, wherein the remaining section of the pressure housing and the window section are machined as a single component.

Embodiment C: The detector assembly of Embodiment A or Embodiment B, wherein the remaining section of the pressure housing and the window section are machined as separate components and subsequently integrated to provide the unitary, integral structure.

Embodiment D: The detector assembly of Embodiment A or Embodiment C, wherein the remaining section of the pressure housing comprises a first material and wherein the window section comprises a second material, wherein the first material and the second material are the same or different.

Embodiment E: The detector assembly of Embodiment D, wherein the first material, the second material, or both the first material and the second material comprise a material having a yield strength sufficient for use in the wellbore and comprising one or more elements, wherein a concentration of the one or more elements each or in combination comprise less than a concentration of the each or the combination of the one or more elements in the subterranean formation.

Embodiment F: The detector assembly of Embodiment D or Embodiment E, wherein the window section further comprises a pocket absent the second material, wherein the pocket absent the second material is fluidly sealed from an outside of the pressure housing.

Embodiment G: The detector assembly of any of Embodiment A to Embodiment F, wherein the window section extends a farther radial distance from a central axis of the remaining section of the pressure housing along an axial length of the window section than the remaining section of the pressure housing radially extends from the central axis of the remaining section of the pressure housing along an axial length of the remaining section.

Embodiment H: The detector assembly of Embodiment G further comprising a cover coupled with the exterior surface of the remaining section of the pressure housing along the axial length thereof, such that the cover does not extend over the window.

Embodiment I: The detector assembly of Embodiment H, wherein the cover extends about a same radial distance from the central axis of the remaining section as the radial distance the window section extends from the central axis of the remaining section, such that the tool has a substantially uniform diameter along an entire axial length thereof.

Embodiment J: The detector assembly of any of Embodiment A to Embodiment I, wherein the radiation detector detects radiation from gamma rays, x-rays, other electromagnetic waves, or neutrons.

Embodiment K: The detector assembly of any of Embodiment A to Embodiment J, wherein the radiation detector comprises a scintillation detector or a neutron detector comprising one or more helium-3 tubes.

Embodiment L: The detector assembly of Embodiment K, wherein the scintillation detector comprises a scintillation crystal optically coupled to a photomultiplier tube (PMT).

Embodiment M: The detector assembly of any of Embodiment A to Embodiment L further comprising a shield disposed within the pressure housing, wherein the shield reduces an amount of radiation produced within the logging tool that reaches the detector, and enables radiation to enter the logging tool through one or more specified vectors, thus enabling azimuthal measurement.

Embodiment N: The detector assembly of Embodiment M, wherein the shield is a gamma radiation shield, and wherein the gamma radiation shield comprises tungsten, lead, or a combination thereof.

Embodiment O: The detector assembly of any of Embodiment A to Embodiment N, wherein the remaining section of the pressure housing is substantially cylindrical along an axial length thereof outside an axial length thereof comprising the window.

Embodiment P: A logging tool comprising the detector assembly of any of Embodiment A to Embodiment O.

Embodiment Q: The logging tool of Embodiment P, wherein the detector assembly is disposed in a tubular.

Embodiment R: The logging tool of Embodiment Q, wherein the tubular is a drill collar, wherein the drill collar defines a fluid flow path along an axial length of the drill collar.

Embodiment S: The logging tool of Embodiment R, wherein a central axis of the fluid flow path is offset from a central axis of the drill collar.

Embodiment T: The logging tool of any of Embodiment Q to Embodiment S, wherein the detector assembly is configured to be disposed in the tubular in a radial, as opposed to an axial, direction.

Embodiment U: The logging tool of any of Embodiment P to Embodiment T further comprising a radiation source disposed within the logging tool and axially spaced from the detector assembly.

Embodiment V: The logging tool of Embodiment U, wherein the radiation source comprises a radioactive chemical gamma radiation source, an x-ray generator, a chemical neutron source, and/or a neutron generator.

Embodiment W: The logging tool of any of Embodiment P to Embodiment V, wherein the logging tool is a logging while drilling tool (e.g., a LWD or MWD) conveyable into the wellbore by a drill string or a wireline tool conveyable into the wellbore via a logging cable (e.g., a wireline cable).

Embodiment X: A method of measuring a property of material in a subterranean formation penetrated by a wellbore, the method comprising: disposing, in the wellbore, the logging tool of any of Embodiment P to Embodiment W; and measuring at least one property of the subterranean formation with the logging tool.

Embodiment Y: The method of Embodiment X, wherein disposing the detector assembly in the wellbore further comprises conveying the logging tool into the wellbore by a drill string or conveying the logging tool into the wellbore via a logging cable (e.g., a wireline cable).

Embodiment Z: The method of Embodiment Y, wherein the detector comprises a gamma radiation detector, and optionally wherein the property comprises a bulk density.

While embodiments have been shown and described, modifications thereof can be made by one skilled in the art without departing from the spirit and teachings of this disclosure. The embodiments described herein are exemplary only, and are not intended to be limiting. Many variations and modifications of the embodiments disclosed herein are possible and are within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, R1, and an upper limit, Ru, is disclosed, any number falling within the range is specifically disclosed. In particular, the following numbers within the range are specifically disclosed: R=R1+k*(Ru-R1), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference herein is not an admission that it is prior art, especially any reference that may have a publication date after the priority date of this application. The disclosures of all patents, patent applications, and publications cited herein are hereby incorporated by reference, to the extent that they provide exemplary, procedural, or other details supplementary to those set forth herein.

I claim:

1. A detector assembly of a logging tool for disposal within a wellbore penetrating a subterranean formation, the detector assembly comprising:
a radiation detector disposed within a pressure housing, the pressure housing including a window section and a remaining section, the window section including a window that provides a path for radiation from outside the pressure housing to the detector,
wherein the window section and the remaining section of the pressure housing form a unitary, integral structure (i) providing no space between the window section and the remaining section of the pressure housing for an influx of fluid from the wellbore between the window section and the remaining section of the pressure housing, (ii) providing a fluid impermeable structural connection between the window section and the remaining section of the pressure housing, (iii) providing a monolithic structural interface between the window section and the remaining section of the pressure housing, or (iv) combinations thereof, and
wherein the window section extends a farther radial distance from a central axis of the remaining section of the pressure housing along an axial length of the window section than the remaining section of the pressure housing radially extends from the central axis of the remaining section of the pressure housing along an axial length of the remaining section.

2. The detector assembly of claim 1, wherein the remaining section of the pressure housing and the window section are machined as a single component, or wherein the remaining section of the pressure housing and the window section are machined as separate components and subsequently integrated to provide the unitary, integral structure.

3. The detector assembly of claim 1 further comprising a cover coupled with the exterior surface of the remaining section of the pressure housing along the axial length thereof, such that the cover does not extend over the window.

4. The detector assembly of claim 3, wherein the cover extends about a same radial distance from the central axis of the remaining section as the radial distance the window section extends from the central axis of the remaining section, such that the tool has a substantially uniform diameter along an entire axial length thereof.

5. The detector assembly of claim 1, wherein the radiation detector detects radiation from gamma rays, x-rays, other electromagnetic waves, or neutrons.

6. The detector assembly of claim 1, wherein the radiation detector comprises a scintillation detector or a neutron detector comprising one or more helium-3 tubes.

7. The detector assembly of claim 1 further comprising a shield disposed within the pressure housing, wherein the shield reduces an amount of radiation produced within the logging tool that reaches the detector, and enables radiation to enter the logging tool through one or more specified vectors, thus enabling azimuthal measurement.

8. The detector assembly of claim 1, wherein the remaining section of the pressure housing is substantially cylindrical along an axial length thereof outside an axial length thereof comprising the window.

9. A detector assembly of a logging tool for disposal within a wellbore penetrating a subterranean formation, the detector assembly comprising:
a radiation detector disposed within a pressure housing, the pressure housing including a window section and a remaining section, the window section including a window that provides a path for radiation from outside the pressure housing to the detector,
wherein the window section and the remaining section of the pressure housing form a unitary, integral structure (i) providing no space between the window section and the remaining section of the pressure housing for an influx of fluid from the wellbore between the window section and the remaining section of the pressure housing, (ii) providing a fluid impermeable structural connection between the window section and the remaining section of the pressure housing, (iii) providing a monolithic structural interface between the window section and the remaining section of the pressure housing, or (iv) combinations thereof,
wherein the remaining section of the pressure housing comprises a first material and wherein the window section comprises a second material, wherein the first material and the second material are the same or different, and
wherein the window section further comprises a pocket absent the second material, wherein the pocket absent the second material is fluidly sealed from an outside of the pressure housing.

10. The detector assembly of claim 9 further comprising a cover coupled with the exterior surface of the remaining section of the pressure housing along the axial length thereof, such that the cover does not extend over the window.

11. The detector assembly of claim 9, wherein the radiation detector detects radiation from gamma rays, x-rays, other electromagnetic waves, or neutrons.

12. The detector assembly of claim 9, wherein the radiation detector comprises a scintillation detector or a neutron detector comprising one or more helium-3 tubes.

13. The detector assembly of claim 9 further comprising a shield disposed within the pressure housing, wherein the shield reduces an amount of radiation produced within the logging tool that reaches the detector, and enables radiation to enter the logging tool through one or more specified vectors, thus enabling azimuthal measurement.

14. A logging tool comprising a detector assembly comprising:
a radiation detector disposed within a pressure housing, the pressure housing including a window section and a remaining section, the window section including a window that provides a path for radiation from outside the pressure housing to the detector, wherein the window section and the remaining section of the pressure housing form a unitary, integral structure (i) providing no space between the window section and the remaining section of the pressure housing for an influx of fluid from the wellbore between the window section and the remaining section of the pressure housing, (ii) providing a fluid impermeable structural connection between the window section and the remaining section of the pressure housing, (iii) providing a monolithic structural interface between the window section and the remaining section of the pressure housing, or (iv) combinations thereof, wherein the detector assembly is disposed in a tubular, and wherein the detector assembly is configured to be disposed in the tubular in a radial, as opposed to an axial, direction.

15. The logging tool of claim 14, wherein the tubular is a drill collar, wherein the drill collar defines a fluid flow path along an axial length of the drill collar.

16. The logging tool of claim 15, wherein a central axis of the fluid flow path is offset from a central axis of the drill collar.

17. The logging tool of claim 14 further comprising a radiation source disposed within the logging tool and axially spaced from the detector assembly, wherein the radiation source optionally comprises a radioactive chemical gamma radiation source, an x-ray generator, a chemical neutron source, and/or a neutron generator.

18. The logging tool of claim 14, wherein the logging tool is a logging while drilling tool conveyable into the wellbore by a drill string or a wireline tool conveyable into the wellbore via a logging cable.

19. A method of measuring a property of material in a subterranean formation penetrated by a wellbore, the method comprising:
disposing, in the wellbore, the logging tool of claim 14; and
measuring at least one property of the subterranean formation with the logging tool.

20. The method of claim 19, wherein disposing the detector assembly in the wellbore further comprises conveying the logging tool into the wellbore by a drill string or conveying the logging tool into the wellbore via a wireline cable.

* * * * *